United States Patent
Doering et al.

(10) Patent No.: US 8,857,250 B2
(45) Date of Patent: Oct. 14, 2014

(54) COMBUSTION CHAMBER PRESSURE SENSOR FOR RECORDING A PRESSURE IN A COMBUSTION CHAMBER OF AN INTERNAL COMBUSTION ENGINE

(75) Inventors: Christian Doering, Stuttgart (DE); Janpeter Wolff, Wurmberg (DE)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 13/323,392

(22) Filed: Dec. 12, 2011

(65) Prior Publication Data

US 2012/0174660 A1   Jul. 12, 2012

(30) Foreign Application Priority Data

Jan. 12, 2011  (DE) .......................... 10 2011 002 596

(51) Int. Cl.
*G01M 15/08* (2006.01)
*G01L 19/06* (2006.01)

(52) U.S. Cl.
CPC .................................. *G01L 19/0681* (2013.01)
USPC ..................................................... 73/114.18

(58) Field of Classification Search
USPC ............................ 73/114.16, 114.18, 114.19
See application file for complete search history.

(56) References Cited

U.S. PATENT DOCUMENTS

| | | | | |
|---|---|---|---|---|
| 4,586,018 A * | 4/1986 | Bettman | .......................... | 338/42 |
| 5,179,861 A * | 1/1993 | Asano et al. | ..................... | 73/726 |
| 6,487,898 B1 * | 12/2002 | Haefner et al. | ............ | 73/114.18 |
| 7,369,032 B2 * | 5/2008 | Kurtz et al. | ..................... | 338/36 |
| 8,003,917 B2 * | 8/2011 | Kern et al. | ..................... | 219/270 |
| 2005/0056097 A1 * | 3/2005 | Banholzer et al. | .............. | 73/700 |
| 2005/0166682 A1 * | 8/2005 | Tanaka et al. | ..................... | 73/753 |
| 2008/0053237 A1 * | 3/2008 | Matsui et al. | ................... | 73/756 |
| 2008/0060440 A1 * | 3/2008 | Toyoda | .......................... | 73/715 |
| 2008/0072680 A1 * | 3/2008 | Matsui et al. | ................... | 73/723 |
| 2008/0121043 A1 * | 5/2008 | Kurtz et al. | ..................... | 73/756 |
| 2009/0321408 A1 * | 12/2009 | Kern et al. | ..................... | 219/270 |
| 2010/0037698 A1 * | 2/2010 | Kern et al. | ..................... | 73/715 |
| 2010/0058874 A1 * | 3/2010 | Dannhauer | ..................... | 73/717 |
| 2010/0294028 A1 * | 11/2010 | Siegenthaler et al. | ..... | 73/114.16 |
| 2011/0088460 A1 * | 4/2011 | Mueller | .................... | 73/114.19 |
| 2012/0234084 A1 * | 9/2012 | Ledermann et al. | ....... | 73/114.18 |

FOREIGN PATENT DOCUMENTS

DE      102009026436      12/2010

* cited by examiner

*Primary Examiner* — Eric S McCall

(74) *Attorney, Agent, or Firm* — Kenyon & Kenyon LLP

(57) ABSTRACT

A combustion chamber pressure sensor is provided for recording a pressure in a combustion chamber of an internal combustion engine, the combustion chamber pressure sensor has a housing having an inner space that is at least partially enclosed by the housing. At least one mechanical-electrical transducer element, for recording the pressure, is accommodated in the housing. The housing has at least one housing opening. The housing opening is sealed by at least one diaphragm. The diaphragm has at least one convex curvature towards the inner space.

13 Claims, 2 Drawing Sheets

COMBUSTION CHAMBER PRESSURE SENSOR FOR RECORDING A PRESSURE IN A COMBUSTION CHAMBER OF AN INTERNAL COMBUSTION ENGINE

CROSS REFERENCE

The present application claims the benefit under 35 U.S.C. §119 of German Patent Application No. DE 102011002596.0 filed on Jan. 12, 2011, which is expressly incorporated herein by reference in its entirety.

BACKGROUND INFORMATION

A number of conventional pressure sensors are able to be used to record a combustion chamber pressure of an internal combustion engine, both in Otto engines and in Diesel engines. Such devices make up a predominant component of modern engine controls, since the combustion chamber pressure has to be recorded very accurately, particularly for the purpose of reducing fuel consumption and emissions.

For instance, German Patent Application No. DE 10 2009 026 436.1 describes various devices for recording a combustion chamber pressure of an internal combustion engine. In this combustion chamber pressure sensor, a sensor housing, on the combustion chamber side, has at least one opening that is closed by at least one diaphragm. Within the sensor housing, at least one mechanical-electrical transducer element is accommodated, at least one transmitting element, that is developed separately from the sensor housing, being provided for transmitting a deformation of the diaphragm to the mechanical-electrical transducer element.

Thus, for the sealing of the sensor housing in combustion chamber pressure sensors from the combustion chamber surroundings, usually, flexible diaphragms, such as metal diaphragms, are used, as shown, for instance, in German Patent Application No. DE 10 2009 026 436.1. Because of their rigidity, which is slight, to be sure, but nevertheless exists, these diaphragms are usually a part of a so-called force path or force transmission path, via which one, or via which several, if several are present, of the forces created by the combustion chamber pressure are transmitted to the actual sensor element, for instance, the mechanical-electrical transducer element. Now, during a combustion process, if a flame front at least partially reaches a diaphragm surface, in the diaphragm there comes about an overtemperature having a gradient between the front side facing the combustion chamber and the rear side situated on the opposite side. Consequently, a temperature profile sets in synchronously with the flame front. However, this temperature profile causes a deformation of the diaphragm, generally, which, as a reaction force, has an effect on the force path, and is thus superposed on the desired pressure signal as an error signal. This error signal occurring with the time constant of a combustion cycle is also designated as thermoshock or short-time drift. Indirect measures may be taken to avoid or reduce this effect. For example, a flame front may be shielded. However, such indirect measures generally involve the danger of a reaction of these measures on a pressure curve at the diaphragm, which may also lead to signal errors.

Therefore, a combustion chamber pressure sensor would be desirable which would, at least to a great extent, avoid the abovementioned effects. In particular, the avoidance of these effects should be based on direct measures which have as small an effect as possible on the actual pressure curve to be measured, and which preferably, at least to a great extent, reduce the thermoshock effect described by a geometrical design of the diaphragm.

SUMMARY

Accordingly, a combustion chamber pressure sensor is provided for recording a pressure in a combustion chamber of an internal combustion engine, which fulfills this task at least to a great extent. The present invention is based on the recognition that, by an adapted shaping of a diaphragm, and preferably by a suitable positioning of one or more fixings of the diaphragm, a force effect of a temperature gradient in the diaphragm may have a minimized axial, that is, signal-influenced component. Under certain circumstances, radial components of the force reaction, that cannot be avoided, of the temperature gradient are uncritical, as a rule, since they mostly do not act in the force path direction.

The combustion chamber pressure sensor provided has a housing that has an at least partially enclosed inner space. This housing may be prepared so that it is able to be inserted into the cylinder head of the internal combustion engine. This housing may, for instance, be fully or partially produced from a metallic material, but basically, other materials may also be used alternatively or additionally, such as ceramic materials and/or plastic materials. By the term housing one should generally understand an element which at least to a great extent gives the combustion chamber pressure sensor its outer shape, and which protects the inside of the combustion chamber pressure sensor from mechanical stresses and preferably also from chemical exposures. The housing may have a cylindrical shape, for example, preferably at an end face facing the housing, beveled edges and/or one or more other types of sealing surfaces being provided which, when the housing is inserted into the cylinder head, achieve a sealing effect. The inner space, a plurality of inner spaces also being able to be provided, is/are at least partially enclosed by the housing, so that the inner space is specified at least to a great extent by the housing. In the housing, and preferably in the inner space, at least one mechanical-electrical transducer element is accommodated for recording the pressure. This basically may involve any element that is equipped to convert mechanical signals to electrical signals, such as a pressure and/or a force to a voltage and/or a current. Without restriction of further embodiments of such mechanical-electrical transducer elements, in the following we shall assume that the mechanical-electrical transducer element includes at least one piezoelectric element, for instance, at least one piezoceramic element.

The housing has at least one housing opening. This housing opening may, in particular, face towards the combustion chamber, for instance, at an end face of the housing, that faces the combustion chamber. As described above, for instance, the housing may have a generally cylindrical shape, deviations from the cylindrical shape being able to be provided; the housing opening, for instance, being able to be situated at an end face of the cylinder facing the combustion chamber. The housing opening may basically be prepared to transmit the combustion chamber pressure to the mechanical-electrical transducer element or to make such a transmission of the pressure possible. The housing opening may basically have any shape, for instance, a polygonal shape or a round shape, preferably a circular shape.

The housing opening is sealed by at least one diaphragm. This sealing preferably takes place in a complete manner, so that no combustion chamber gases are able to penetrate through the housing opening into the inner space. For this purpose, the diaphragm may be provided by itself or, as will be described in greater detail below, it may also cooperate, for example, with one or more other elements, for instance, a pressure transmitting element which is preferably inserted into the housing opening or penetrates through the housing opening. For example, the diaphragm and the pressure transmitting element together are able to seal the housing opening, so that no combustion chamber gases are able to penetrate into the inner space.

The term "diaphragm" generally means a deformable or movable element, which extends, for instance, perpendicular to an axis of the sensor housing, the lateral extension of the diaphragm, for instance, an extension perpendicular to the axis of the sensor housing substantially exceeding a thickness of the diaphragm, for instance, a thickness parallel to the axis, by at least a factor of 10, for example, particularly by a factor of at least 100. The diaphragm may be a flexible element, for instance, a foil-type element or an element in the form of a thin, flexible disk. The diaphragm may be designed as a metallic diaphragm, for example, and may also include a metal foil, for example. A composite of a plurality of foils is also possible, for instance, a composite of a plurality of metallic materials and/or a composite of at least one metallic foil material having at least one non-metallic foil material, to which, for instance, the metallic foil material is connected and/or on which it is coated. The diaphragm may be developed in one piece with the housing, for example, but it may basically also be connected to the housing in the vicinity of the at least one housing opening, in a force-locking or a continuous material manner, for instance, at one or more fixings that will be described in greater detail below.

In accordance with the present invention, the adapted shaping of the diaphragm, which lowers, or at least avoids to a great extent, the axial component of the force reaction because of the temperature gradient, may be achieved particularly if the diaphragm has at least one convex curvature. By convex curvature one should understand, in this context, a shaping in which the diaphragm has a convex profile in a sectional plane perpendicular to the lateral extension of the diaphragm, for instance, in a sectional plane parallel to an axis of the combustion chamber pressure sensor, the convex side, i.e., the closed side of the convex profile, facing the inner space. The diaphragm may have at least one local, or preferably global extreme value in this sectional plane, for example, whose closed side faces the inner space and whose open side faces the combustion chamber. Consequently, the diaphragm may be curved to face the inner space and preferably may curve into the inner space.

The combustion chamber pressure sensor may have at least one pressure transmitting element. This pressure transmitting element should be devised to transmit the combustion chamber pressure at least partially to the mechanical-electrical transducer element. The pressure transmitting element may thus preferably be a component of a force transmitting path, the combustion chamber pressure sensor being able to have one or more of such force transmitting paths, preferably exactly one. The pressure transmitting element may preferably include at least one mechanically rigid material, via which the combustion chamber pressure is able to be transmitted to the mechanical-electrical transducer element, for instance, a cylindrical and/or a circular cylindrical and/or a rod-shaped element. In particular, the pressure transmitting element may include at least one push rod. The pressure transmitting element may at least partially be situated in the inner space, or may also be accommodated completely in the inner space. The pressure transmitting element may extend, for instance, exclusively within the inner space, for instance, from the mechanical-electrical transducer element to the diaphragm. It is particularly preferred, however, as is described in greater detail below, if the pressure transmitting element extends all the way through the diaphragm, for instance, all the way to the combustion chamber, so that the pressure transmitting element is also able to project into the opening or project outwards via the opening. Thus, the pressure transmitting element is able to be acted upon directly or indirectly by the combustion chamber pressure, preferably directly. Consequently, the force transmitting path may be embodied, for example, in such a way that a combustion chamber pressure acts directly upon an end face of the pressure transmitting element, for instance, of the push rod, in that this end face is directly in contact with the combustion chamber gases, for example. This combustion chamber pressure is preferably transmitted by the pressure transmitting element, all the way through the diaphragm, onto the mechanical-electrical transducer element, for instance, onto an end face of the piezo element. However, other embodiments are also basically possible, such as the interposition of one or more intermediate elements between the pressure transmitting element and the mechanical-electrical transducer element.

If the combustion chamber pressure sensor has at least one, preferably exactly one pressure transmitting element, a push rod, for example, preferably a push rod that penetrates through the diaphragm, for instance, penetrates it axially, the diaphragm may particularly have at least one fixing on the housing and at least one fixing on the pressure transmitting element. This fixing may basically include one or more connections, for instance, one or more force-locking and/or form-locking and/or continuous material connections, such as welding connections and/or clamping connections. The at least one fixing may be a point, a line or even a region. Without restricting additional possible embodiments, in the following, the designations fixing points, fixing lines or fixing regions are also used. For example, the fixing of the diaphragm on the housing may be designed to be annular, for instance, along a circular line. The fixing on the pressure transmitting element may be designed to be planar, for instance, or may be linear.

Thus, as was described above, it is particularly preferred if the pressure transmitting element penetrates through the diaphragm, for instance, centrally, for example, as a push rod penetrating the diaphragm centrally. In this case it is particularly preferred if the fixing on the pressure transmitting element includes at least one circumferential fixing line. The pressure transmitting element may, for instance, have the shape of a cylindrical push rod, for instance, a push rod having a circular or polygonal cross section. In this case, the fixing may, for instance, circumferentially enclose the pressure transmitting element in one closed line. However, other designs are basically also possible. In general, the pressure transmitting element is preferably able to extend on an axis of the combustion chamber pressure sensor, for example, in the form of an axial push rod, which is situated at least partially within the housing, and which penetrates through the diaphragm. The diaphragm may then enclose the pressure transmitting element particularly in an annular manner.

If the diaphragm encloses the pressure transmitting element in an annular manner, then in a view parallel to the axis, the diaphragm ring may basically have any shape, preferably an annular shape. However, variations from the annular shape are also basically possible, such as having an outer shape that is polygonal, and an inner shape that also has a polygonal shape. The combination of polygonal and circular embodiments is also possible, as well as additional embodiments of the annular shape.

The diaphragm preferably encloses the pressure transmitting element in an annular manner. The diaphragm may, particularly in a sectional plane parallel to the axis, and preferably in a sectional plane that includes the axis, have a U-shaped design on each side of the axis. By U-shaped design one should understand, in this context, a design in which, starting from the axis, a curve goes in one direction which has at least one directional component parallel to the axis, followed by at least one extreme value, at which, in turn, a curve follows in an opposite direction, having at least one directional component parallel to the axis, and opposite to the first curve. The U shape may preferably be continuous, and may have a rounded shape or even an angular shape. Accordingly, under a U shape, the shape of a U, of a V or even of a rectangle may be subsumed, or other shapes that have the curves described above. In order to ensure the abovementioned curvature, a closed side of the U-shaped form should face toward the inner space.

If the pressure transmitting element extends to an axis of the combustion chamber pressure sensor and if the diaphragm encloses the pressure transmitting element annularly, the diaphragm may particularly have an outer fixing on the housing, such as an outer fixing having an annular shape or a polygonal shape. Furthermore, the diaphragm may have an inner fixing on the pressure transmitting element, such as, as stated above, again an annular or polygonal fixing, corresponding, for instance, to the outer embodiment of the pressure transmitting element. The inner fixing may preferably be situated offset by an amount dy>0 from the outer fixing in the direction towards the inner space, for instance, by an amount dy>0.1 mm, preferably an amount dy>0.3 mm and, for instance, an amount dy=0.4 mm to 1.5 mm, for instance, an amount dy=0.6 mm to 0.8 mm and preferably an amount dy=0.7 mm. The curvature of the diaphragm described, towards the inner space, may extend particularly, starting from the outer fixing, beyond the inner fixing, to the inner space. In other words, the inner fixing and the outer fixing are able to be situated offset from each other along the axis, the inner fixing being able to be situated with respect to the outer fixing in the direction of the inner space, the curvature between the outer fixing and the inner fixing being able to extend beyond the inner fixing to the inner space. This may take place using the above-mentioned U shape, for example. For instance, the curvature, starting from the outer fixing, may extend maximally by an amount Y in the direction of the inner space, the ratio dy/Y amounting to 0.05 to 0.8, preferably 0.1 to 0.5, and especially preferred 0.3 to 0.4, and particularly 0.35. This may be implemented, in the case of a U shape having basically any cross section, in that the ratio of the difference of the arm lengths of the U to the length of the longer arm of the U, which points to the outer side of the housing, amounts to the values stated.

The outer fixing may particularly have a diameter, in the case of which, in a noncircular embodiment of the outer fixing, instead of the diameter, an equivalent diameter would have to be applied. This diameter may amount to, for instance, 4 mm to 8 mm, preferably 5 mm to 7 mm and particularly 6.3 mm. The inner fixing may have a diameter of 2 mm to 4 mm, for example, preferably of 2.5 mm to 3.5 mm and particularly 3 mm.

As was described above, the pressure transmitting element may extend particularly out from the inner space into the opening. The pressure transmitting element preferably extends from out of the inner space all the way through the opening. The pressure transmitting element may, for instance, have an end face which is acted upon directly by gases of the combustion chamber, so that the pressure of the combustion chamber gases is transmitted directly onto the pressure transmitting element, for example. Then, in the inner space, a direct or an indirect pressure transmission is able to take place, or, and this should not be distinguished within the scope of the present invention, a transmission of force to the mechanical-electrical transducer element, by the pressure transmitting element.

The combustion chamber pressure sensor provided according to one or more of the advantageous embodiments, described above, has multiple advantages compared to the conventional combustion chamber pressure sensors. Thus, in particular, a direct measure is provided, using which the effect of the abovementioned thermoshock effects on the signals of the combustion chamber pressure sensor is able to be avoided, at least to a great extent. This is about a direct measure, without a pressure curve being perhaps influenced because of it at the diaphragm and/or the pressure transmitting element. In particular, because of the embodiment of the diaphragm described above, axial force components, which could have an effect on the signals of the combustion chamber pressure sensor, may be at least approximately minimized. By contrast, radial force components may be negligible or at least tolerable, particularly because of the preferred U shape. Thus, in total, the signal quality of the combustion chamber pressure sensor is able to be improved and the influencing of the signals by thermoshock effects is able to be clearly reduced.

BRIEF DESCRIPTION OF THE DRAWINGS

Additional details and features of possible embodiments of the present invention are yielded by the following description of preferred exemplary embodiments, which are shown schematically in the figures.

DETAILED DESCRIPTION OF EXAMPLE EMBODIMENTS

Figure 1:
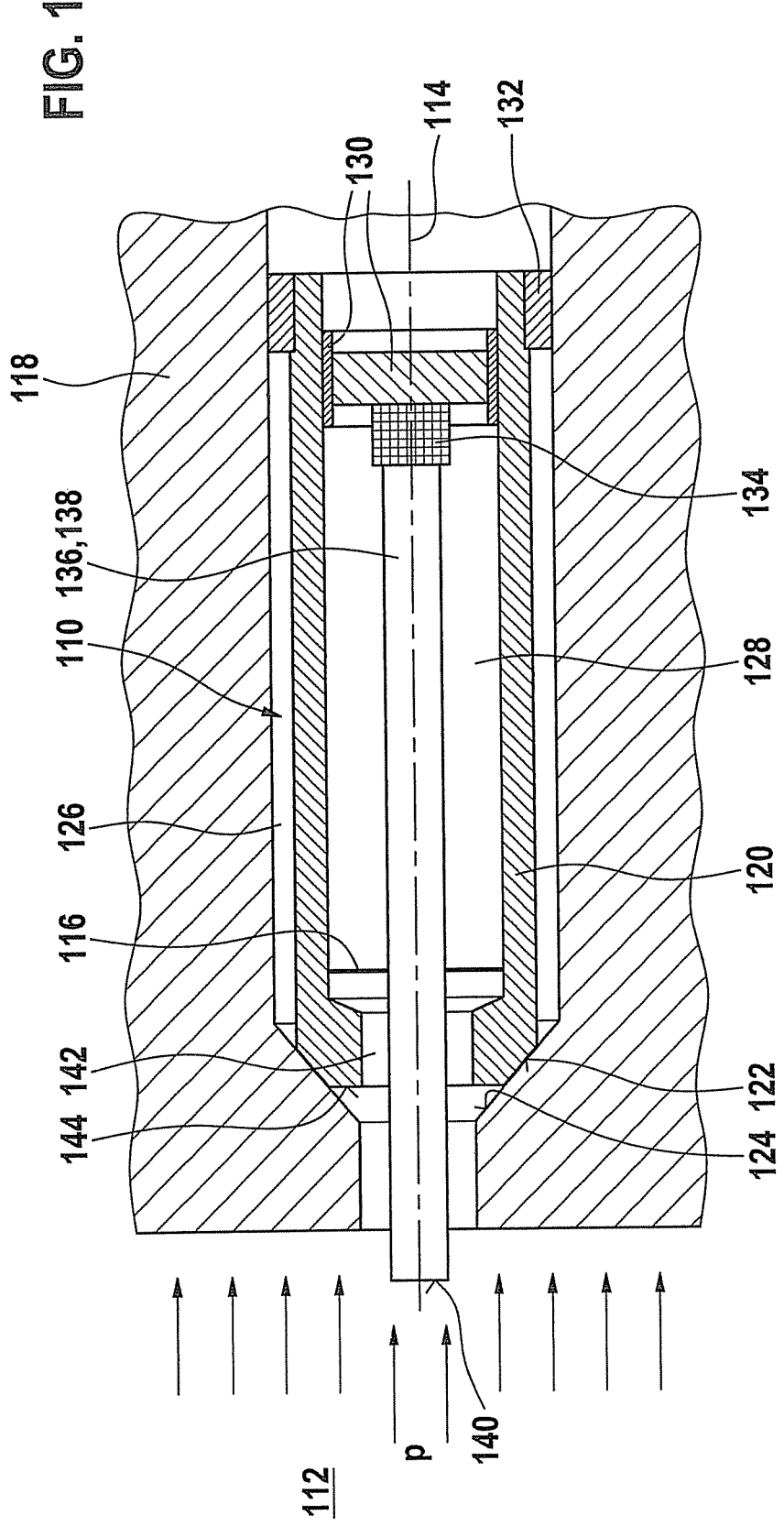
FIG. 1 shows a sectional representation of a combustion chamber pressure sensor, used in a cylinder head.
Figure 2:
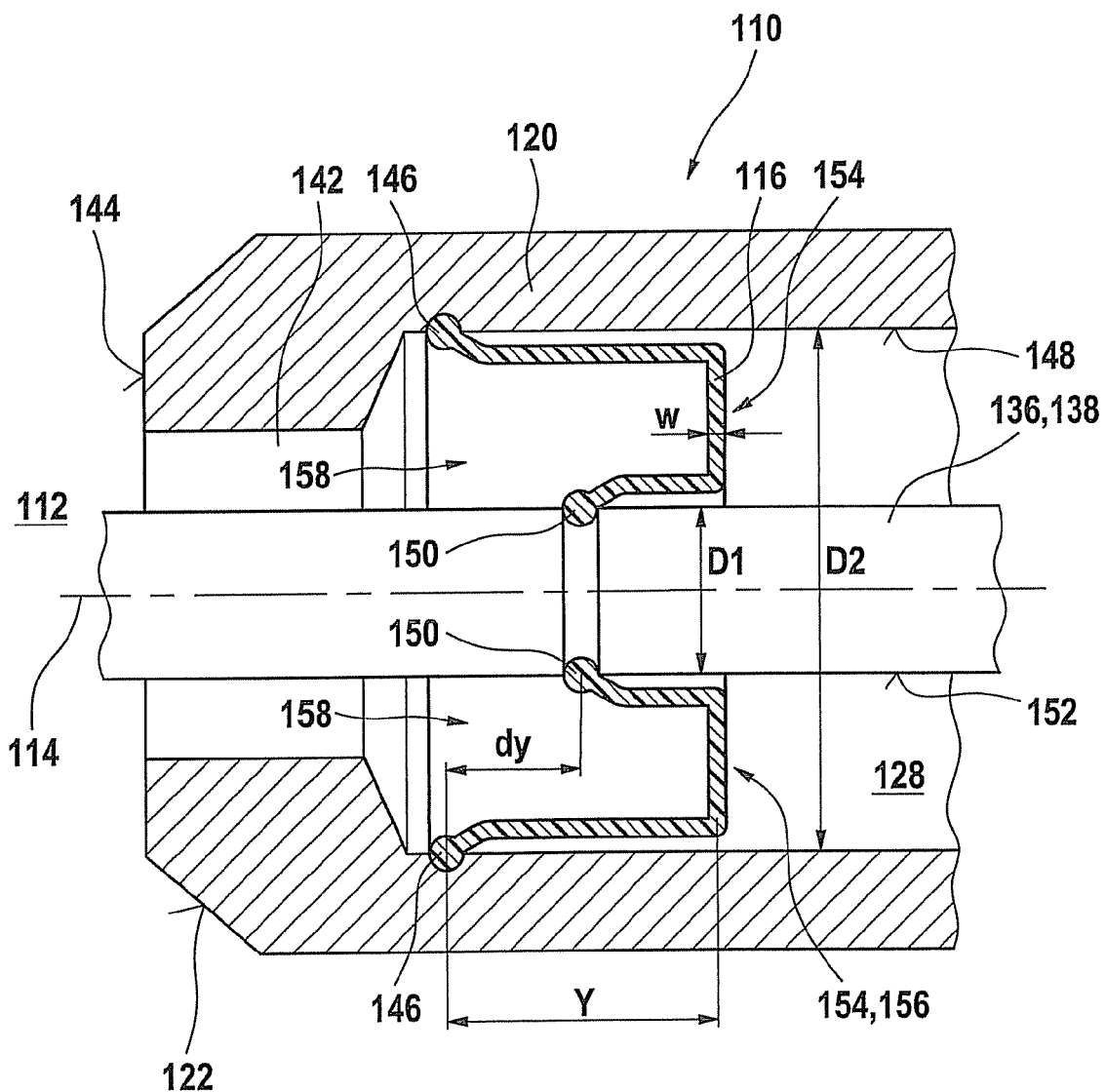
FIG. 2 shows a schematic cutout representation of a diaphragm of the combustion chamber pressure sensor according to FIG. 1.

In FIGS. 1 and 2, an exemplary embodiment of a combustion chamber pressure sensor 110, according to the present invention, for recording a pressure p in a combustion chamber 112 of an internal combustion engine is shown schematically. In each case, sectional representations are shown in a sectional plane parallel to an axis 114 of combustion chamber pressure sensor 110. In this context, FIG. 1 shows an overall view of combustion chamber pressure sensor 110, whereas FIG. 2 shows a cutout representation of combustion chamber pressure sensor 110 in the vicinity of a diaphragm 116. This diaphragm 116 is shown only schematically in the representation according to FIG. 1.

Combustion chamber pressure sensor 110, as may be noted in FIG. 1, is let into a cylinder head 118 of the internal combustion engine. Combustion chamber pressure sensor 110 includes a housing 120 which, in the exemplary embodiment shown, is designed in an exemplary fashion as a generally cylindrical housing 120. This housing 120 may be a cylinder sleeve, for example. At its front end, facing combustion chamber 112, housing 120 may have a conical sealing surface 122, using which housing 120 is pressed against a corresponding supporting surface 124 of a bore 126 in cylinder head 118.

Housing 120 encloses an inner space 128. On the back, on the side of combustion chamber pressure sensor 110 facing away from combustion chamber 112, inner space 128 may be bordered by one or more fixing elements 130 and/or may be at least partially closed. These fixing elements 130, for instance, may be screwed into housing 120 and/or welded into it. On its outside, at the back end, combustion chamber pressure sensor 110 is held in bore 126 of cylinder head 118 using one or more fixing elements 132.

In the exemplary embodiment shown, in inner space 128, at least one mechanical-electrical transducer element 134 is accommodated, that is, basically any sensor element that is equipped to record pressure p in combustion chamber 112 directly or indirectly. This may be a piezo element, for example. It may be supported on one or more fixing elements 130, for instance, in inner space 128.

In the exemplary embodiment shown, combustion chamber pressure sensor 110 also has at least one pressure transmitting element 136. As in the exemplary embodiment shown, this may be embodied as a push rod 138 supported axially on axis 114, for instance, which is designed to transmit pressure p indirectly or directly to mechanical-electrical transducer element 134.

As may be seen in the representation according to FIG. 1, pressure transmitting element 136 may have pressure p of the combustion chamber act upon it in the axial direction via an end face 140, which is exposed directly to the combustion chamber pressure, for example, in that end face 140 juts into combustion chamber 112. For the purpose of the pressure application, housing 120 has at its end facing combustion chamber 112 a housing opening 142, such as a circular opening in an end face 144 of housing 120. In the exemplary embodiment shown, pressure transmitting element 136 is able to jut through this housing opening 142, all the way into combustion chamber 112, for example. However, other designs are basically also possible. Consequently, in the exemplary embodiment shown, end face 144 encloses pressure transmitting element 136 coaxially, for example.

For the purpose of sealing inner space 128, combustion chamber pressure sensor 110 has abovementioned diaphragm 116 which, in the exemplary embodiment shown, in an exemplary manner, encloses pressure transmitting element 136 in an annular manner. For the details of a possible embodiment of this diaphragm 116, according to the present invention, we refer to FIG. 2.

At its outer circumference, along an outer fixing 146, diaphragm 116 is connected to an inner wall 148 of housing 120. This outer fixing 146 may include, for instance, an encircling welding seam and/or another type of fixing. At its inner side facing pressure transmitting element 136, diaphragm 116 is connected along an inner fixing 150 to an outer surface 152 of pressure transmitting element 136. In this instance, this may again be a welding seam and/or a clamping and/or another type of the inner fixing. For outer fixing 146 and/or inner fixing 150, one may basically consider all known types of connection, that is, form locking and/or force locking and/or continuous material connections. Even simple snap-on connections, such as via grooves in inner wall 148 and/or outer surface 152 may be considered, for instance, optionally supported by continuous material connections.

As may be seen in FIG. 2, diaphragm 116, which is designed to be annular in this exemplary embodiment, has a U shape that has a curvature 154 that extends towards inner space 128, that is, away from combustion chamber 112. Thus, in the cross sectional representation according to FIG. 2, starting from outer fixing 146, diaphragm 116 extends first away from combustion chamber 112, towards inner space 128, namely, by a quantity designated as Y in FIG. 2. There, in the region of outermost extension of this curvature 154, a reversal takes place, and diaphragm 116 extends back in the direction of combustion chamber 112 and to inner fixing 150. Thus, all in all, a closed side 156 of the U shape faces inner space 128, whereas an open side 158 of the U shape faces combustion chamber 112. As may also be seen in the preferred exemplary embodiment according to FIG. 2, inner fixing 150 and outer fixing 146 are offset with respect to each other in the axial direction. Inner fixing 150 is preferably offset, in this context, by an amount dy in the axial direction towards inner space 128, that is, away from combustion chamber 112.

A study using a finite element method has generally confirmed that, when there is a temperature gradient over the thickness of diaphragm 116, which is designated in FIG. 2 by w, the offset dy of the two fixings 146, 150, which may be embodied as "diaphragm fixing points" or "fixing lines", is advantageous. With the aid of simulations, such as ones according to the finite element method, it can be shown for certain geometries that the offset dy to push rod 138 and housing 120 has to be at a certain ratio to axial extension Y at a given wall thickness w, so that the thermoshock effect will be a minimum. In addition, an outer diameter D1 of push rod 138 and an inner diameter D2 of housing 120 are meaningful for optimum ratio dy/Y. As FIG. 2 shows, however, it is very advantageous, independently of the precise dimensions, if open side 158 of diaphragm 116 points forward, to the heat source, in this case towards combustion chamber 112, as shown in FIG. 2. As a concrete example of a dimensioning, to which the present invention is not limited, however, may be named in the following exemplary manner:

D1=3.0 mm
D2=6.3 mm
W=0.3 mm
Y=2.0 mm
Dy=0.7 mm

Other embodiments are, however, also possible within the scope of the present invention.

What is claimed is:

1. A combustion chamber pressure sensor for recording a pressure in a combustion chamber of an internal combustion engine, the combustion chamber pressure sensor comprising:
   a housing that has an inner space that is at least partially enclosed by the housing;
   at least one mechanical-electrical transducer element for recording the pressure, the at least one mechanical-electrical transducer element accommodated in the inner space of the housing;
   at least one diaphragm, the housing having at least one opening and being sealed by the at least one diaphragm, wherein the diaphragm has at least one convex curvature that curves towards and into the inner space of the housing; and
   at least one pressure transmitting element to transmit the combustion chamber pressure at least partially to the mechanical-electrical transducer element, wherein the diaphragm has at least one fixing on the housing and at least one fixing on the pressure transmitting element, and wherein the pressure transmitting element penetrates through the diaphragm.

2. The combustion chamber pressure sensor as recited in claim 1, wherein the pressure transmitting element extends into the housing opening and through the housing opening out of the inner space.

3. The combustion chamber pressure sensor as recited in claim 1, wherein the pressure transmitting element extends on an axis of the combustion chamber pressure sensor, and the diaphragm encloses the pressure transmitting element in an annular manner.

4. The combustion chamber pressure sensor as recited in claim 3, wherein the diaphragm has a U-shaped form in a sectional plane parallel to the axis on each side of the axis, a closed side of the U-shaped form pointing towards the inner space.

5. A combustion chamber pressure sensor for recording a pressure in a combustion chamber of an internal combustion engine, the combustion chamber pressure sensor comprising:
- a housing that has an inner space that is at least partially enclosed by the housing;
- at least one mechanical-electrical transducer element for recording the pressure, the at least one mechanical-electrical transducer element accommodated in the housing;
- at least one diaphragm, the housing having at least one opening and being sealed by the at least one diaphragm, wherein the diaphragm has at least one convex curvature towards the inner space of the housing; and
- at least one pressure transmitting element to transmit the combustion chamber pressure at least partially to the mechanical-electrical transducer element, wherein the diaphragm has at least one fixing on the housing and at least one fixing on the pressure transmitting element, wherein the pressure transmitting element extends on an axis of the combustion chamber pressure sensor, and the diaphragm encloses the pressure transmitting element in an annular manner, wherein the diaphragm has a U-shaped form in a sectional plane parallel to the axis on each side of the axis, a closed side of the U-shaped form pointing towards the inner space, and wherein the diaphragm has an outer fixing on the housing, the diaphragm having an inner fixing on the pressure transmitting element, the inner fixing being situated offset by an amount $dy>0$ in a direction towards the inner space with respect to the outer fixing.

6. The combustion chamber pressure sensor as recited in claim 5, wherein the curvature of the diaphragm, starting from the outer fixing, extends beyond the inner fixing to the inner space.

7. The combustion chamber pressure sensor as recited in claim 6, wherein the curvature, starting from the outer fixing extends maximally by an amount Y in the direction towards the inner space, the ratio $dy/Y$ amounting to 0.1 to 0.5.

8. The combustion chamber pressure sensor as recited in claim 6, wherein the curvature, starting from the outer fixing extends maximally by an amount Y in the direction towards the inner space, the ratio $dy/Y$ amounting to 0.3 to 0.4.

9. The combustion chamber pressure sensor as recited in claim 6, wherein the curvature, starting from the outer fixing extends maximally by an amount Y in the direction towards the inner space, the ratio $dy/Y$ amounting to 0.35.

10. The combustion chamber pressure sensor as recited in claim 6, wherein the curvature, starting from the outer fixing extends maximally by an amount Y in the direction towards the inner space, the ratio $dy/Y$ amounting to 0.05 to 0.8.

11. The combustion chamber pressure sensor as recited in claim 10, wherein the outer fixing has a diameter of 4 mm to 8 mm, and wherein the inner fixing has a diameter of 2 mm to 4 mm.

12. The combustion chamber pressure sensor as recited in claim 10, wherein the outer fixing has a diameter of 5 mm to 7 mm, and wherein the inner fixing has a diameter of 2.5 mm to 3.5 mm.

13. The combustion chamber pressure sensor as recited in claim 10, wherein the outer fixing has a diameter of 6.1 mm, and wherein the inner fixing has a diameter of 3.0 mm.

* * * * *